(12) United States Patent
Matsuyama et al.

(10) Patent No.: US 8,697,289 B2
(45) Date of Patent: Apr. 15, 2014

(54) BATTERY ELECTRODE HAVING LAYERS OF DIFFERING BULK DENSITIES OF CONDUCTIVE ADDITIVE

(75) Inventors: Chizuru Matsuyama, Yokohama (JP); Takuya Kinoshita, Yokosuka (JP); Kyouichi Watanabe, Yokohama (JP); Yoshinori Naruoka, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 950 days.

(21) Appl. No.: 12/141,507

(22) Filed: Jun. 18, 2008

(65) Prior Publication Data

US 2008/0318133 A1    Dec. 25, 2008

(30) Foreign Application Priority Data

Jun. 20, 2007  (JP) .................................. 2007-162916

(51) Int. Cl.
*H01M 4/62*  (2006.01)
*H01M 4/80*  (2006.01)

(52) U.S. Cl.
USPC .......................................... 429/235; 429/232

(58) Field of Classification Search
USPC ................................................ 429/122–347
See application file for complete search history.

(56) References Cited

U.S. PATENT DOCUMENTS

| 5,360,686 | A   | * | 11/1994 | Peled et al. ................. 429/312 |
| 7,767,339 | B2  |   | 8/2010  | Suzuki et al. |
| 2002/0028380 | A1 | * | 3/2002 | Tanjo et al. .................... 429/209 |
| 2003/0031933 | A1 | * | 2/2003 | Shembel et al. ............. 429/316 |
| 2003/0054243 | A1 |   | 3/2003  | Suzuki et al. |
| 2006/0115735 | A1 |   | 6/2006  | Yasuda et al. |
| 2006/0175704 | A1 | * | 8/2006 | Shimizu et al. ............... 257/758 |
| 2008/0311471 | A1 |   | 12/2008 | Suzuki et al. |

FOREIGN PATENT DOCUMENTS

| CN | 1635659 A    | 7/2005 |
| CN | 1711654 A    | 12/2005 |
| EP | 1 662 592 A1 | 5/2006 |
| JP | 07-320987 A  | 12/1995 |
| JP | 9-320569 A   | 12/1997 |
| JP | 10-106585 A  | 4/1998 |
| JP | 11-250900 A  | 9/1999 |
| JP | 2000-11995 A | 1/2000 |
| JP | 2003-163006 A | 6/2003 |

OTHER PUBLICATIONS

Machine Translation of JP 2000-011995 originally published on Jan. 2000 to Ryu Satoshi.*

* cited by examiner

*Primary Examiner* — Jonathan G Leong
(74) *Attorney, Agent, or Firm* — Foley & Lardner LLP

(57) ABSTRACT

A battery electrode, includes: a collector; and an active material layer formed on a surface of the collector and including: an active material, and a conductive additive having a bulk density which is gradually decreased in a direction from a collector side of the active material layer to a surface side of the active material layer.

15 Claims, 6 Drawing Sheets

BATTERY ELECTRODE HAVING LAYERS OF DIFFERING BULK DENSITIES OF CONDUCTIVE ADDITIVE

BACKGROUND OF THE INVENTION

1. Field of the Invention

The present invention relates to a battery electrode. Especially, the present invention relates to the battery electrode capable of improving output density of a lithium ion secondary battery.

2. Description of the Related Art

Recently, from the viewpoint of environment and fuel economy, a hybrid car, an electric car, a fuel cell car are produced and sold, accompanied by continued new development of the above cars. With the above cars which are so called electric vehicles, activating of a power source capable of charging and discharging is essential. For the above power source, secondary batteries such as lithium ion battery, nickel hydrogen cell and the like, electric double layer capacitor and the like are used. Among the above, the lithium ion secondary battery, which has a high energy density and a high resistance to repeated chargings and dischargings, is considered to be preferable for use for the electric vehicle, thus leading to various on-going developments of the lithium ion secondary battery. Typically, the lithium ion secondary battery has such a structure that a positive electrode and a negative electrode are connected via an electrolyte layer, which electrodes and layer are received in a cell case. Hereinabove, the positive electrode has such a structure that a positive electrode active material layer including a positive electrode active material, a conductive additive, a binder and the like is formed on each of first and second layers of a positive electrode collector, while the negative electrode has such a structure that a negative electrode active material layer including a negative electrode active material, a conductive additive, a binder and the like is formed on each of first and second layers of a negative electrode collector.

For improving capacity density per capacity or energy density per capacity, it is preferable to form the positive electrode active material layer and the negative electrode active material layer on the collectors in such a manner that the above layers each have a thickness as great as possible. In the case of an electrode having an active material layer having a film thickness greater than or equal to 100 μm, however, a first active material in the vicinity of a surface and contacting an electrolyte layer and a second active material in the vicinity of a collector are put in conditions different in electrode reaction. Therefore, it is difficult to improve output according to thickness of the active material layer by giving sufficient performance to both of the first and second active materials.

A battery having an electrolyte layer using any of solid polymer electrolyte and gel electrolyte has such an advantage that a liquid leak from the battery is unlikely. The above electrolyte layer, however, has a high viscosity. Therefore, in the case of a thick electrode having an active material layer greater than or equal to 100 μm, the solid polymer electrolyte and gel electrolyte each are not capable of sufficiently permeating in the active material layer, thereby, as the case may be, failing to efficiently make an electrode reaction.

Therefore, a method for varying voidage of the active material layer in a stack direction is adopted.

Japanese Patent Application Laid-Open No. Heisei 9 (1997)-320569 (=JP9320569) discloses such a technology that an active material layer has a relatively low voidage in the vicinity of a collector while the active material layer has a relatively high voidage in the vicinity of a surface contacting an electrolyte layer, thus effectively permeating an electrolytic solution in the active material layer.

SUMMARY OF THE INVENTION

It is an object of the present invention to provide a battery electrode using a polymer electrolyte for an electrolyte layer, where the battery electrode can bring about high output while keeping an energy density.

According to a first aspect of the present invention, a battery electrode, comprises: a collector; and an active material layer formed on a surface of the collector and including: an active material, and a conductive additive having a bulk density which is gradually decreased in a direction from a collector side of the active material layer to a surface side of the active material layer.

According to a second aspect of the present invention, a battery electrode, comprises: a collector, and an active material layer formed on a surface of the collector and including: an active material, and a conductive additive having a bulk density which is in a range of 0.01 g/ml to 0.05 g/ml, content of the conductive additive in the active material layer being gradually increased in a direction from a collector side of the active material layer to a surface side of the active material layer.

According to a third aspect of the present invention, a method of producing a battery electrode comprises: preparing n types of slurries each including: an active material, a conductive additive, and a solvent, wherein the preparing is implemented by using n types of the conductive additives having different bulk densities, and the n denotes an integer of two or more, applying the slurries in an order of the bulk densities of the included conductive additives to a surface of a collector, wherein the order is from larger to smaller, forming, thereby, a coated film including n sublayers, wherein the n denotes an integer of two or more, and pressing the coated film in a stack direction.

According to a fourth aspect of the present invention, a method of producing a battery electrode comprises: preparing n types of slurries each including: an active material, m types of conductive additives having different bulk densities, and a solvent, wherein the preparing is implemented by varying compounding ratios of the conductive additives, and the m and the n each denote an integer of two or more, applying the slurries in an order of averages of the bulk densities of the conductive additives to a surface of a collector, wherein the order is from larger to smaller, and wherein the bulk densities are weighted by the compounding ratios of the conductive additives, forming, thereby, a coated film including n sublayers, wherein the n denotes an integer of two or more, and pressing the coated film in a stack direction.

According to a fifth aspect of the present invention, a lithium ion secondary battery, comprises: at least one unit cell layer including: a positive electrode, an electrolyte layer and a negative electrode which are stacked in this order, wherein at least one of the positive electrode and the negative electrode is the battery electrode according to the first aspect.

According to a sixth aspect of the present invention, a battery module, comprises: the lithium ion secondary battery according to the fifth aspect.

According to a seventh aspect of the present invention, a vehicle, comprises: the lithium ion secondary battery according to the fifth aspect.

According to an eighth aspect of the present invention, a vehicle, comprises: the battery module according to the sixth aspect.

Other objects and features of the present invention will become understood from the following description with reference to the accompanying drawings.

BRIEF DESCRIPTION OF THE DRAWINGS

FIG. 6A is a plan view of the battery module, FIG. 6B is a front view of the battery module and FIG. 6C is a side view of the battery module.

DESCRIPTION OF THE PREFERRED EMBODIMENTS

Figure 1:
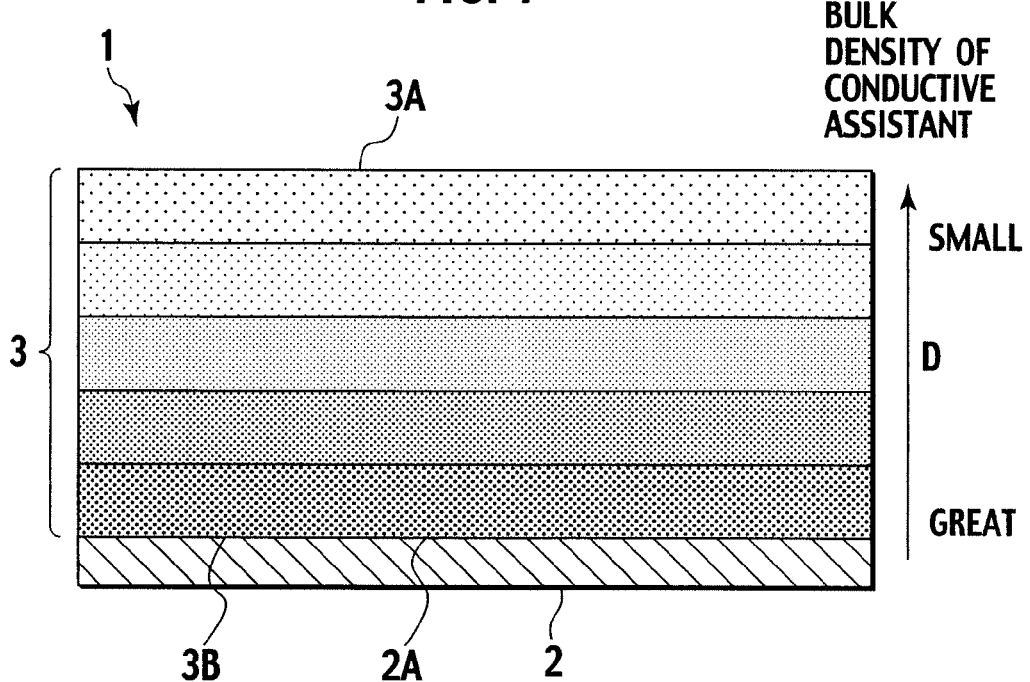
FIG. 1 is a schematic of a cross sectional view of a battery electrode, according to a section I of a first embodiment of the present invention.

An active material layer of a battery electrode of the present invention has such a structure that a conductive additive in the active material layer has a bulk density which is gradually decreased in a direction from a collector side of the active material layer to a surface side (i.e., electrolyte side) of the active material layer. With the above structure, voidage in the active material layer is increased in the direction from the collector side of the active material layer to the surface side of the active material layer. As such, even a high-viscosity polymer electrolyte can effectively permeate in the active material layer, thus preparing a high-capacity battery. Moreover, in the case of adjusting the voidage, the above structure does not need to increase content of binder, thus contributing to increasing capacity of the battery. Moreover, a facial-most sublayer on the surface side of the active material layer includes the conductive additive having a high bulk density. As such, the active material layer can follow volume expansion which may be caused when contacting the electrolyte, thus preventing exfoliation of the active material layer.

Hereinafter, embodiments of the present invention are to be set forth. However, the technical scope of the present invention is to be determined based on claims and therefore not limited to the following embodiments.

For ease of understanding, the following description will contain various directional terms, such as left, right, upper, lower, forward, rearward and the like. However, such terms are to be understood with respect to only a drawing or drawings on which the corresponding part of element is illustrated.

(First Embodiment)
(Structure)

Under the present invention, a battery electrode, comprises: a collector, and an active material layer formed on a surface of the collector and including: an active material, and a conductive additive having a bulk density which is gradually decreased in a direction from a collector side of the active material layer to a surface side of the active material layer.

Hereinabove and hereinafter, an electrolyte layer including electrolyte is disposed on the surface side of the active material layer.

Hereinafter, structure of the battery electrode of the present invention is to be set forth, referring to the drawings. Under the present invention, however, drawings are emphasized for convenience sake. Therefore, the technical scope of the present invention is not limited to the embodiments in the drawings.

Moreover, an embodiment or embodiments other than those shown in the drawings may be adopted.

<Section I>

FIG. 1 is a schematic of a cross sectional view of a battery electrode, according to a section I of a first embodiment of the present invention. A battery electrode 1 according to the section I of the first embodiment in FIG. 1 has such a structure that an active material layer 3 is formed on a surface 2A (upper in FIG. 1) of a collector 2. In addition, main compositions of the battery electrode are an active material, a conductive additive and a binder, to be described afterward.

As shown in FIG. 1, the battery electrode 1 (hereinafter, otherwise referred to as "electrode" for short) of the present invention has the active material layer 3 having such a structure that bulk density of the conductive additive is gradually decreased in a direction D from the collector side 3B to a surface side 3A.

According to the section I of the first embodiment in FIG. 1, the conductive additive having the bulk density which is gradually decreased in the direction D from the collector side 3B to surface side 3A of the active maternal layer 3 can bring about the following effects 1 and 2:

Effect 1: even when a gel electrolyte which is relatively high in viscosity is used for an electrolyte layer, a good electrode reaction can be accomplished.

Effect 2: even when a polymer electrolyte which is relatively low in ion conductivity is used for the electrolyte layer, an ion conduction path can be smoothened, thus improving output.

Moreover, the conductive additive having the smaller bulk density on the surface side of the active material layer enlarges the conductive additive's volume relative to the active material's surface. Thereby, a high conductivity can be obtained even when voidage of the active material layer is relatively high, thus bringing about a battery electrode having a low resistance. Moreover, in the case of adjusting the voidage, the above structure does not need to increase content of the binder, thus improving energy density of the battery, to thereby prepare a high-capacity battery.

With the battery electrode 1 of the present invention, the active material layer 3 may have the following structures:

1) two or more sublayers including conductive additives having different bulk densities are stacked.

2) the bulk density of the conductive additive is continuously decreased in the direction D from the collector side 3B to surface side 3A of the active material layer 3. Continuously varying the bulk density can vary the voidage of the active material layer 3, thereby more effectively penetrating the electrolyte in the active material layer 3. Moreover, even when an electrolyte having a low ion conductivity is used, the ion conduction path can be smoothened, to thereby improve cell output.

Meanwhile, in the case of the active material layer 3 having a plurality of sublayers {see 1) above}, the number of sublayers is preferably from 2 to 10 and more preferably from 2 to 5. In this structure, bulk density difference between adjacent sublayers is preferably from 0.03 g/ml to 0.1 g/ml and more preferably from 0.05 g/ml to 0.1 g/ml.

Moreover, in the case of the active material layer 3 having two or more stacked sublayers {see 1) above}, the conductive additive included in each of the sublayers may be one type of conductive additive or a combination of two or more types of conductive additives. In the case of the combination of two or more types of conductive additives for one sublayer, the bulk densities of the respective conductive additives included in the respective sublayers are so adjusted that weighting averages of the bulk densities of the conductive additives by compounding ratios of the conductive additives are decreased in the direction D from the collector side 3B to the surface side 3A. Especially, in the case of the active material layer 3 having five or more sublayers, varying compounding ratios of a plurality of conductive additives can prepare sublayers having different voidages. In this case, therefore, the number of types of the conductive additives may be smaller than the number of sublayers, which is advantageous in terms of production cost.

Moreover, the conductive additive's content in the active material layer 3 is preferably 5 mass % to 20 mass % and more preferably 10 mass % to 15 mass %. With the battery electrode 1 in FIG. 1, the conductive additive's content in the active material layer 3 is preferably constant in the stack direction D, so as to preferably keep electron conduction in the active material layer 3.

In the case of the active material layer 3 having two or more sublayers, the bulk density of the conductive additive included in a facial-most sublayer on the surface side 3A is preferably less than or equal to 0.05 g/ml and more preferably less than or equal to 0.04 g/ml and still more preferably less than or equal to 0.03 g/ml, which is to be described afterward. The bulk density within the above ranges can effectively progress penetration of the electrolyte, thus improving the cell output A lower limit of the bulk density of the conductive additive included in the facial-most sublayer is not specifically limited, preferably however, 0.01 g/ml and more preferably 0.02 g/ml, in view of handling. In this case, the voidage of the facial-most sublayer is preferably 30% to 60% and more preferably 40% to 50%. The bulk density and voidage within the above ranges can effectively progress penetration of the electrolyte, thus improving the cell output.

Meanwhile, the bulk density of the conductive additive included in the sublayer contacting the collector 2 is not specifically limited, preferably 0.1 g/ml to 0.2 g/ml and more preferably 0.15 g/ml to 0.2 g/ml. The bulk density within the above ranges can further decrease the voidage. In this case, the voidage of the sublayer contacting the collector 2 is preferably 30% to 50% and more preferably 30% to 40%.

Moreover, when one or more intermediate sublayers is formed between the sublayer contacting the collector 2 and the facial-most sublayer on the surface side 3A, the density of the conductive additive of the intermediate sublayer(s) is preferably less than or equal to 0.1 g/ml and more preferably 0.07 g/ml to 0.08 g/ml. In this case, the voidage of the intermediate sublayer(s) is preferably 30% to 40% and more preferably 35% to 40%.

Ratio of i) the bulk density of the conductive additive included in the facial-most sublayer on the surface side 3A relative to ii) the bulk density of the conductive additive included in the sublayer contacting the collector 2 is preferably 0.2 to 0.4 and more preferably 0.2 to 0.3. The bulk density ratio within the above ranges can effectively progress the penetration of the electrolyte, thus improving the cell output.

<Section II>

Figure 2:
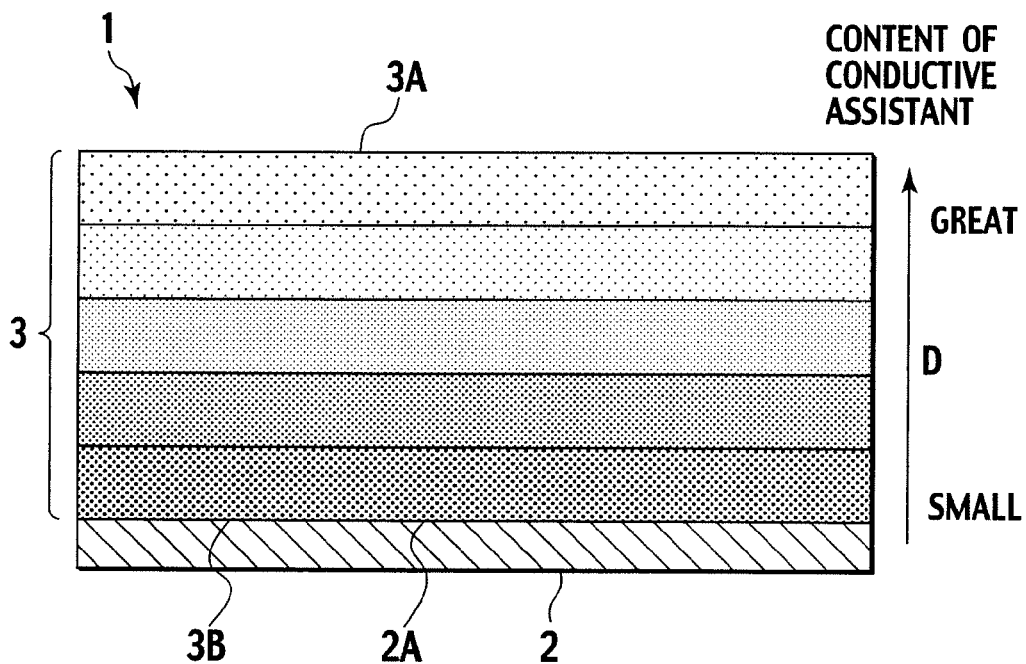
FIG. 2 is a schematic of cross sectional view of the battery electrode, according to a section II of the first embodiment of the present invention.

FIG. 2 is a schematic of a cross sectional view of the battery electrode, according to a section II of the first embodiment of the present invention.

According to the section II of the first embodiment in FIG. 2, the active material layer 3 of the electrode 1 is formed with a plurality of sublayers. In this structure, one type of conductive additive having a relatively small bulk density, preferably less than or equal to 0.05 g/ml, is used, and content of the conductive additive is gradually increased in the direction D from the collector side 3B's sublayer to the surface side 3A's sublayer. Due to the above structure, the voidage of each of the sublayers included in the active material layer 3 is increased in the direction D from the collector side 3B's sublayer to the surface side 3A's sublayer. Therefore, like the section I in FIG. 2, the section II of the first embodiment in FIG. 2 can effectively impregnate the polymer electrolyte having high viscosity. Thereby, even in the case of an electrolytic solution having a low ion conductivity, an ion conduction path is smoothened, to thereby improve the cell output.

According to the section II of the first embodiment in FIG. 2, the usable conductive additive has a bulk density which is preferably less than or equal to 0.05 g/ml, more preferably less than or equal to 0.04 g/ml and still more preferably less than or equal to 0.03 g/ml. The bulk density within the above ranges can effectively progress penetration of the electrolyte, thus improving the cell output A lower limit of the bulk density of the conductive additive is not specifically limited. In view of handling, however, the bulk density of the conductive additive is preferably more than or equal to 0.01 g/ml and more preferably more than or equal to 0.02 g/ml.

According to the section II of the first embodiment in FIG. 2, content of the conductive additive of the facial-most sublayer is preferably 5 mass % to 30 mass % and more preferably 10 mass % to 20 mass %. In this case, voidage of the facial-most sublayer is preferably 30% to 60% and more preferably 40% to 50%. The voidage within the above ranges can effectively progress penetration of the electrolyte, thus improving the cell output.

Herein, the number of sublayers is 2 to 10 and more preferably 2 to 5. In this structure, content ratio, specifically, i) content of the conductive additive included in the facial-most sublayer on the surface side 3A relative to ii) content of the conductive additive included in the sublayer contacting the collector 2 is preferably 1 to 3 and more preferably 1 to 2. The content ratio within the above ranges can effectively progress penetration of the electrolyte, thus improving the cell output.

According to the section II of the first embodiment in FIG. 2, using one type of conductive additive can form the active material layer 3 having a stack of a plurality of sublayers having different voidages, to thereby lowering material cost.

(Structure of Battery Electrode)

Hereinafter, a structure of the battery electrode of the present invention is to be set forth, where the battery electrode 1 is applied to a lithium ion secondary battery. According to the battery electrode of the present invention, the conductive additive in the active material layer has a bulk density which is gradually decreased in a direction from the collector side of the active material layer to the surface side of the active material layer. Selection of the collector, active material, binder, supporting electrolyte (lithia water=lithium salt), ion conductive polymer, and other compound which is added when necessary is not specifically limited. According to application, the above may be selected by properly referring to conventional technologies. Moreover, the battery electrode of the present invention is applicable to both of the positive electrode and negative electrode. Applying the battery electrode to the positive electrode in view of especially reactivity and the like, however, can bring about more remarkable effect than that brought about by applying to the negative electrode which is more likely to use an active material having high conductivity. For applying the battery electrode to the positive electrode, compounds known to serve respectively as a positive electrode collector and a positive electrode active material are preferable.

[Collector]

The collector 2 includes such conductive materials as aluminum foil, nickel foil, copper foil, stainless (SUS) foil and the like. A typical thickness of the collector 2 is 1 μm to 30 μm, but not limited thereto.

Size of the collector 2 is determined according to the application of the lithium ion secondary battery. The collector 2 has a large area for preparing a large electrode 1 for a large battery while having a small area for preparing a small electrode 1 for a small battery.

[Active Material Layer]

The active material layer 3 is formed on the collector 2. The active material layer 3 includes the active material and conductive additive which are main servants of charging and discharging reactions. When the electrode 1 of the present invention is used as a positive electrode, the active material layer 3 includes a positive electrode active material, while the electrode 1 of the present invention is used as a negative electrode, the active material layer 3 includes a negative electrode active material.

The positive electrode active material is preferably a lithium-transition metal compound oxide, examples thereof including Li—Mn compound oxide such as $LMn_2O_4$, Li—Ni compound oxide such as $LiNiO_2$, and the Like. As the case may be, an arbitrary combination of two or more of the positive electrode active materials is allowed.

The negative electrode active material is preferably the lithium-transition metal compound oxide set forth above or carbon. Examples of carbon include natural carbon, artificial carbon, graphite carbon materials such as expansion graphite, carbon black, active carbon, carbon fiber, coke, soft carbon, hard carbon and the like. As the case may be, an arbitrary combination of two or more of the negative electrode active materials is allowed.

An average particle diameter of the active material is not specifically limited, preferably 0.1 μm to 20 μm, more preferably 0.1 μm to 15 μm and especially preferably 0.1 μm to 10 μm, but not specifically limited thereto. In addition, the average particle diameter of the active material under the present invention is measured by means of a laser diffraction particle distribution meter (i.e., laser diffraction scattering method).

Moreover, content of the positive electrode active material in the positive electrode active material layer is preferably 70 mass % to 99 mass % and more preferably 80 mass % to 99 mass %, while content of the negative electrode active material in the negative electrode active material layer is preferably 80 mass % to 99 mass % and more preferably 90 mass % to 99 mass %.

The conductive additive is defined as an additive which is mixed in the active material layer 3 so as to improve conductivity of the active material layer 3.

Examples of the conductive additive used in the present invention include carbon black such as acetylene black, carbon powder such as graphite, various carbon fibers such as vapor grown carbon fiber (VGCF: trademark registered), and the like. Specific examples of the above include acetylene black such as HS100 (bulk density 0.15 g/ml), FX35 (bulk density 0.05 g/ml) and VGCF (bar-shaped) (bulk density 0.04 g/ml), graphite such as KS6 (phosphor chip) (bulk density 0.07 g/ml), Super-P (cluster-shaped) (bulk density 0.16 g/ml), SP450 (bulk density 0.1 g/ml) and SP-5030 (bulk density 0.07 g/ml), and ketjen black such as EC300J (bulk density 0.1 g/ml to 0.15 g/ml) and ECP (bulk density 0.015 g/ml to 0.05 g/ml), and the like.

The acetylene black (AB) is categorized into i) first species (powdery, bulk density 0.03 g/ml to 0.06 g/ml), ii) second species (50% press, bulk density 0.06 g/ml to 0.1 g/ml) and iii) third species (100% press, bulk density 0.11 g/ml to 0.18 g/ml). Herein, 50% press acetylene black is prepared in such a manner that a powdery acetylene black having a first bulk density is so pressed as to have a second bulk density twice as large as the first bulk density. Likewise, 100% press acetylene black is prepared in such a manner that the 50% press acetylene black having the second bulk density is so pressed as to have a third bulk density twice as large as the second bulk density.

The particle diameter of the conductive additive is preferably 0.01 μm to 50 μm and more preferably 0.01 μm to 20 μm. The particle diameter of the conductive additive is measured by means of a laser diffraction particle distribution meter. For example, in the case of the conductive additive formed into the phosphor chip, bar-shaped and the like, the particle diameter is defined as the longest distance connecting both ends.

When the active material layer 3 has two or more sublayers according to the section I of the first embodiment in FIG. 1, the conductive additive included in the facial-most sublayer on the surface side 3A preferably has a bulk density less than or equal to 0.05 g/ml. VGCF, FX35 and ECP are preferable for the conductive additive included in the facial-most sublayer on the surface side 3A, where the VGCF is especially preferable. Use of a bar-shaped conductive additive such as VGCF can secure conductivity while keeping the voidage high.

Herein, the bulk density (g/ml) of the conductive additive is calculated in the following manner:

1) 100 ml of a test sample is gradually input into a 100 ml measuring cylinder which is inclined.

2) Measure mass of the test sample to 0.1 g unit (e.g. 100.2 g, 100.4 g).

3) Cork up the measuring cylinder including the test sample.

4) Drop the corked measuring cylinder from a height of 5 cm down to a rubber plate.

5) Perform 50 drops.

6) Measure a volume of the compressed test sample by the following expression.

$$D = W/V \qquad \text{[Expression]}$$

D: Bulk density (g/ml)
W: Mass (g)
V: Volume (ml) of test sample after 50 drops

With the electrode 1 of the present invention, thickness of the active material layer 3 is preferably 20 μm to 500 μm, more preferably 20 μm to 400 μm and still more preferably 20 μm to 300 μm. Thickness in the above ranges can preferably prepare the active material layer 3 having a plurality of sublayers.

Moreover, each of the sublayers of the active material layer 3 is preferably 10 μm to 100 μm more preferably 10 μm to 80 μm and still more preferably 10 μm to 50 μm. Each of the sublayers having the thickness in the above ranges can prevent an exfoliation of the electrode 1. Moreover, the thickness in the above ranges can elongate a solution volatilization period in drying operation, thereby decreasing a possible segregation of binder in thickness direction, which is preferable.

When the active material layer 3 (especially, a positive electrode active material layer) is formed with the first active material sublayer on the surface side 3A and the second active material sublayer on the collector side 3B according to the section I of the first embodiment in FIG. 1, especially, a structure that the conductive additive included in the first active material sublayer is VGCF while the conductive additive included in the second active material sublayer is Super-P or SP450 can contribute to improvement of the cell output.

Moreover, according to the section II of the first embodiment in FIG. 2, it is preferable that the conductive additive has a bulk density less than or equal to 0.05 g/ml and more preferably less than or equal to 0.03 g/ml. VGCF, FX35 and ECP are especially preferable for the conductive additive.

When necessary, the active material layer 3 may include other materials, examples thereof including binder, supporting electrolyte (lithia water=lithium salt), ion conductive polymer and the like. When the ion conductive polymer is included in the active material layer 3, a polymerizing initiator for initiating polymerization of the polymer may be included in the active material layer 3.

Examples of the binder include polyvinylidene fluoride (PVdF), synthetic rubber and the like. Use of the binder can bind the active material to the conductive additive, thus securing the active material.

Examples of the supporting electrolyte (lithia water=lithium salt) include $Li(C_2F_5SO_2)_2N(LiBETI)$, $LiPF_6$, $LiBF_4$, $LiClO_4$, $LiAsF_6$, $LiCF_3SO_3$ and the like.

Examples of the ion conductive polymer include polyethylene oxide (PEO) polymer and polypropylene oxide (PPO) polymer. Herein, the above polymers may be same as or different from an ion conductive polymer(s) used for the electrolyte layer of the cell to which the electrode 1 of the present invention is applied. The same polymer is, however, preferable.

The polymerizing initiator is added (mixed) for acting on a cross-linking base of the ion conductive polymer, so as to promote cross-liking reaction. According to external factors for allowing the polymerizing initiator to act as an initiator, the polymerizing initiator is categorized into a photo polymerizing initiator, a thermal polymerizing initiator and the like. Examples of the polymerizing initiator include azobisisobutyronitrile (AIBN) as the thermal polymerizing initiator, benzyl dimethyl ketal (BDK) as the photo polymerizing initiator, and the like.

Compounding ratio of components in the active material layer 3 is not specifically limited and therefore can be adjusted referring to a known technology about the lithium secondary battery. A preferable example of the compounding ratio is: binder relative to total active material layer=1 mass % to 5 mass %.

(Production Method)

The production method of the battery electrode 1 of the present invention is not specifically limited, and therefore may be determined referring to a conventional technology in the art of producing battery electrode. Hereinafter, a method of producing the battery electrode 1 is to be set forth, referring to FIG. 1, where the battery electrode 1 has such a structure that the active material layer 3 includes a plurality of sublayers and that the bulk density of the conductive additives in the respective sublayers is gradually decreased in the direction D from the collector side 3B to the surface side 3A.

The electrode 1 is prepared, for example, by the following repeated operations:

1) preparing active material slurries each including an active material, a conductive additive and a solvent, 2) to the collector 2, applying the active material slurries in the order of the conductive additive having greater bulk density to smaller bulk density, and 3) drying the thus applied.

Each of the active material slurries may include one type of conductive additive or a combination of two or more types of conductive additives.

In the case of one active material slurry having two or more types of conductive additives, the following operations are taken:

i) weighting averages of the bulk densities of the conductive additives by compounding ratios of the conductive additives, and ii) applying the slurries in the order of the averages (larger to smaller) of the bulk densities.

Otherwise, for example, a first active material slurry including one type of conductive additive may be combined with a second active material slurry including two or more types of conductive additives, such that the first and second active material slurries are stacked.

Moreover, including plural types of conductive additives which are different from each other per active material slurry is allowed. In this case, preferably, the solvent for preparing the active material slurry is prepared by at least two types, that is, an organic solvent and an aqueous solvent. For preparing each of the active material slurries, alternately applying the active material slurry (prepared by using the organic solvent) and the active material slurry (prepared by using the aqueous solvent) can prevent the following inconvenience even when a plurality of active material slurries are applied in an overlapped manner:

a possible mixture of the layers which mixture may occur when the above layers are dissolved during the application.

After the active material slurries are sequentially applied and then dried, the thus prepared stack structure is pressed, to thereby prepare the electrode 1.

At first, a preferable active material and a preferable conductive additive, and if necessary, other components {such as binder, supporting electrolyte (lithia water=lithium salt), ion conductive polymer, polymerizing imitator and the like} are mixed in a solvent, to thereby prepare the active material slurry. Specific form of each of the components mixed in the active material slurry is as set forth in the above description about the structure of the electrode 1 of the present invention, and therefore detailed explanations of the above specific form are omitted. As a matter of course, the positive electrode active material is added to the slurry for preparing the positive electrode, while the negative electrode active material is added to the slurry for preparing the negative electrode.

Type of the solvent or mixing measure is not specifically limited, and therefore those conventionally known in the art of producing the electrode may be properly referred to. Examples of an organic solvent include N-methyl-2-pyrrolidone (NMP), dimethyl formamide, dimethyl acetoamide, methyl formamide and the like. For preparing the active material slurry using the organic solvent, binders, preferably point binders such as PVDF, acrylic resin, SBR (styrene butadiene rubber) and the like are used. In the case of using polyvinylidene fluoride (PVDF) as a binder, NMP is preferably used as a solvent.

Examples of the aqueous solvent include SBR, acrylic resin, PTFE (polytetrafluoroethylene) and the like. In the case of using the aqueous solvent for preparing the active material slurry, binders, preferably point binders such as SBR, acrylic resin and the like are used.

Then, the collector 2 for forming thereon the active material layer 3 is to be prepared. Specific form of the collector 2 to be prepared under the present invention is as set forth in the above description about the structure of the electrode 1 of the present invention, therefore detailed explanations of the collector 2 are omitted.

Then, the above prepared active material slurry is applied to the surface 2A of the collector 2 prepared above, to thereby form a coated film.

Measures for applying the active material slurry is not specifically limited, for example, those typically used such as self-acting coater may be used. In addition, use of any of an ink jet method, a doctor blade method and a combination thereof can form a thin layer and accomplish a multi-step application of two or more of the active material slurries having various types or various contents of the conductive additives.

Then, the coated film formed on the surface 2A of the collector 2 is dried, to thereby remove the solvent in the coated film.

Measures for drying the coated film are not superficially limited, and therefore those conventionally known in the field of producing electrode can be properly used, examples thereof including heat treatment Drying conditions (drying period, drying temperature and the like) may be properly determined according to: 1) amount of active material slurry to be applied or 2) rate of volatilizing solvent of slurry.

Then, the thus coated film is pressed. Pressing measure is not specifically limited and therefore those conventionally known may be properly used, examples thereof including calender roll, plane table press and the like.

With the above pressing method, a single pressing operation is allowed even for preparing an active material layer by stacking a plurality of sublayers, thus simplifying operations, resulting in decreased production cost.

(Second Embodiment)

According to a second embodiment, a battery is formed by using the battery electrode 1 of the first embodiment.

That is, according to the second embodiment, the battery includes at least one unit cell layer having such a structure that a positive electrode, an electrolyte layer and a negative electrode are sequentially stacked, wherein at least one of the positive electrode and the negative electrode is the electrode of the present invention. The electrode of the present invention is applicable to any of the positive electrode, negative electrode and a bipolar electrode. The battery including the electrode of the present invention as at least one electrode belongs to the technical scope of the present invention. It is preferable, however, that the electrode of the present invention is used to serve as all electrodes of the battery. The above structure can effectively improve cell capacity and cell output.

The structure of a secondary battery of the present invention is not specifically limited, examples thereof including those conventionally known such as stack (flat), rolled (cylindrical) and the like. Moreover, examples of electric connection (electrode structure) in the lithium ion secondary battery include an internal parallel connection and an internal series connection (bipolar).

Under the present invention, adopting the stack (flat) structure for the battery can secure a long-term reliability due to seal technologies such as an easy thermocompression bonding, which is advantageous in view of cost and operability (workability).

Hereinafter, a lithium ion secondary battery (internal parallel connection) and a lithium ion secondary battery (internal series connection—bipolar) of the present invention are to be set forth, but not specifically limited thereto.

<Section I>

Figure 3:
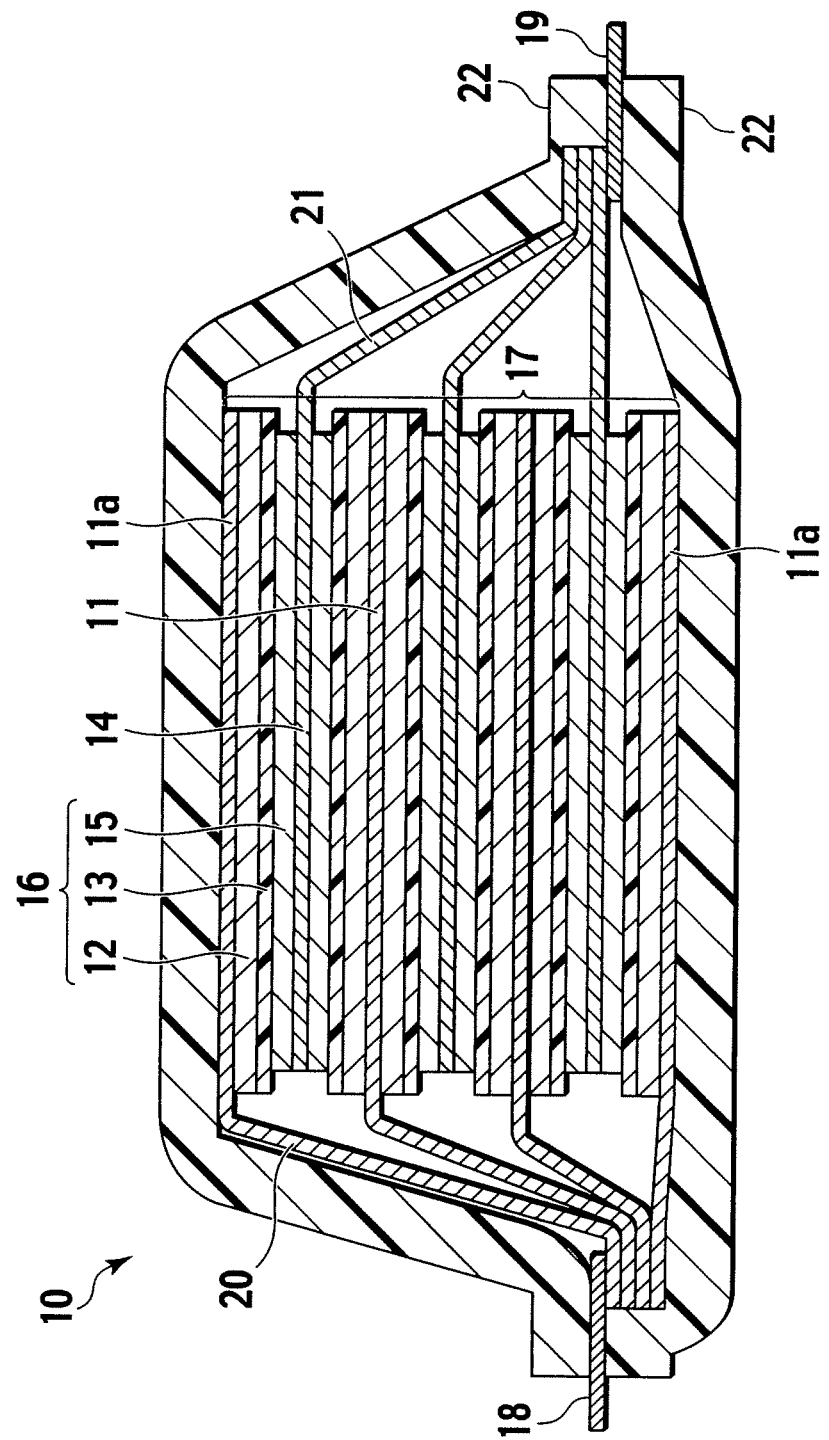
FIG. 3 shows a typical lithium ion secondary battery, that is, a schematic of a cross sectional view of an entire structure of a flat stack non-bipolar lithium ion secondary battery, according to a section I of a second embodiment of the present invention.

FIG. 3 shows a typical lithium ion secondary battery, according to a section I of the second embodiment of the present invention. More specifically, FIG. 3 shows a schematic of a cross sectional view of an entire structure of a flat (stack) non-bipolar lithium ion secondary battery (hereinafter, otherwise referred to as "non-bipolar lithium ion secondary battery" or "non-bipolar secondary battery" for short).

As shown in FIG. 3, a non-bipolar lithium ion secondary battery 10 according to the section I of the second embodiment has a cell outer package 22 using a composite laminate film including polymer and metal. Joining entirety of the periphery of the laminate film through heat sealing brings about such a structure that a generating element (cell element) 17 is sealed and received in the cell outer package 22. Herein, the generating element (cell element) 17 has such a structure that a positive electrode plate, a separator layer 13 and a negative electrode plate are stacked, where the positive electrode plate has a positive electrode collector 11 having first and second faces each formed with a positive electrode (positive electrode active material layer) 12 while the negative electrode plate has a negative electrode collector 14 having first and second faces each formed with a negative electrode (negative electrode active material layer) 15. In the above structure, via the separator layer 13, the positive electrode (positive electrode active material layer) 12 on the first face of the first positive electrode plate faces the negative electrode (negative electrode active material layer) 15 on the first face of the first negative electrode plate adjacent to the first positive electrode plate, thus forming a plurality of the positive electrode plates, separator layers 13 and negative electrode plates which are stacked.

With the above structure, the positive electrode (positive electrode active material layer) 12, separator layer 13 (adjacent to the positive electrode 12) and negative electrode (negative electrode active material layer) 15 (adjacent to the separator layer 13) in combination form a single unit cell layer 16. With a plurality of stacked unit cell layers 16, the lithium ion secondary battery 10 according to the section I of the second embodiment has such a structure that the unit cell layers 16 are electrically connected in parallel. In addition, each of outermost positive electrode collectors 11a positioned in respective outermost parts (uppermost and lowermost in FIG. 2) of the generating element (cell element; stack structure) 17 has one face alone that is formed with the positive electrode (positive electrode active material layer) 12. Otherwise, the structure in FIG. 2 may be so modified that each of outermost negative electrode collectors (not shown in FIG. 2) positioned in respective outermost parts (uppermost and lowermost in FIG. 2) of the generating element (cell element; stack structure) 17 has one face alone that is formed with the negative electrode (negative electrode active material layer) 15.

Moreover, a positive electrode tab 18 and a negative electrode tab 19 conductive with the respective positive electrode plate and negative electrode plate are mounted to the respective positive electrode collector 11 and negative electrode collector 14 via a positive electrode terminal lead 20 and a negative electrode terminal lead 21 respectively, where an ultrasonic welding, a resistance welding or the like works for the above mounting operation. As such, being sandwiched by the heat sealed portions, the positive electrode tab 18 and the negative electrode tab 19 each are exposed outward from the cell outer package 22.

<Section II>

Figure 4:
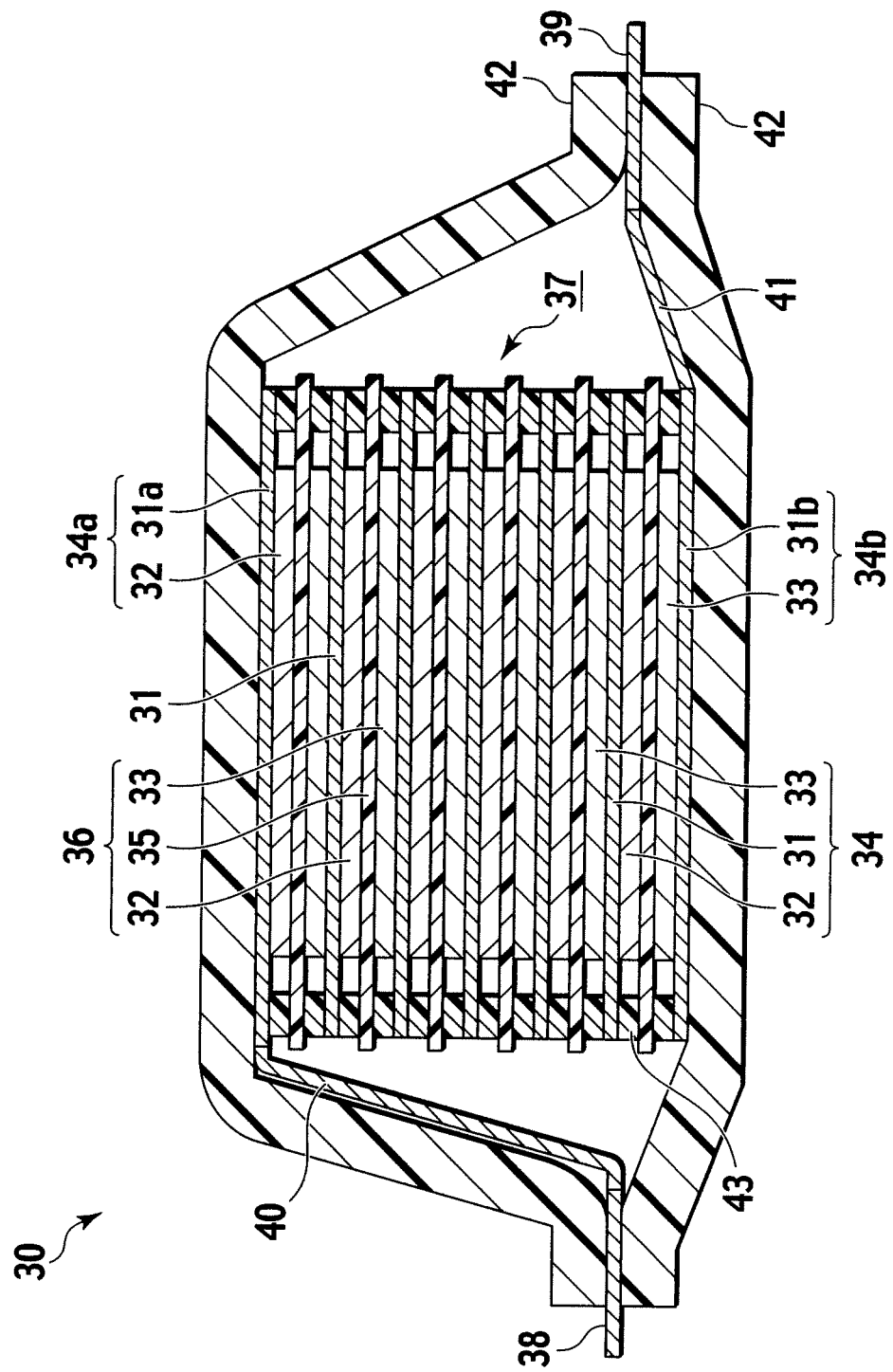
FIG. 4 shows a typical lithium ion secondary battery, that is, a schematic of a cross sectional view of an entire structure of a flat stack bipolar lithium ion secondary battery, according to a section II of the second embodiment of the present invention.

FIG. 4 shows a typical bipolar lithium ion secondary battery, according to a section II of the second embodiment of the present invention. More specifically, FIG. 4 shows a schematic of a cross sectional view of an entire structure of a flat (stack) bipolar lithium ion secondary battery (hereinafter, otherwise referred to as "bipolar lithium ion secondary battery" or "bipolar secondary battery" for short).

As shown in FIG. 4, a bipolar lithium ion secondary battery 30 according to the second section II of the second embodiment has such a structure that a substantially rectangular generating element (cell element) 37 for actually promoting charging and discharging reactions is sealed and received in a cell outer package 42. As shown in FIG. 4, the generating element (cell element) 37 of the bipolar lithium ion secondary battery 30 according to the section II of the second embodiment has such a structure that a plurality of bipolar electrodes 34 sandwich therebetween a separator layer 35. Hereinabove, via the separator layer 35, a positive electrode (positive electrode active material layer) 32 of the bipolar electrode 34 opposes a negative electrode (negative electrode active material layer) 33 of the adjacent bipolar electrode 34. Herein, the bipolar electrode 34 has a collector 31 having a first face formed with the positive electrode (positive electrode active material layer) 32 and a second face formed with the negative electrode (negative electrode active material layer) 33. In other words, the bipolar lithium ion secondary battery 30 has such a structure that the generating element 37 includes a plurality of bipolar electrodes 34 which are stacked via the separator layers 35.

The positive electrode (positive electrode active material layer) 32, the separator layer 35 (adjacent to the positive electrode 32) and the negative electrode (negative electrode active material layer) 33 (adjacent to the separator layer 35) form a single unit cell layer 36 (otherwise referred to as "cell unit" or "unit cell"). As such, it is also interpreted that the bipolar lithium ion secondary battery 30 has such a structure that the unit cell layers 36 are stacked. Moreover, the periphery of the unit cell layer 36 has a seal portion (insulator layer) 43 for preventing a liquid junction attributable to the electrolytic solution leaking from the separator layer 35. Providing the seal portion (insulator layer) 43 can insulate the adjacent collectors 31 from each other, and prevent a short circuit which may be caused by a contact between the adjacent positive electrode 32 and negative electrode 33.

In addition, an outermost positive electrode side electrode 34a and an outermost negative electrode side electrode 34b of the generating element (cell element) 37 may have a structure other than a bipolar electrode. In other words, the electrodes 34a, 34b may have the respective positive electrode (positive electrode active material layer) 32 and negative electrode (negative electrode active material layer) 33 each disposed only on the first face which is necessary for one of the respective collectors 31a, 31b (or terminal plates). Specifically, the positive electrode (positive electrode active material layer) 32 may be disposed only on the first face of the positive electrode side outermost collector 31a in the generating element (cell element) 37. Likewise, the negative electrode (negative electrode active material layer) 33 may be disposed only on the first face of the negative electrode side outermost collector 31b in the generating element (cell element) 37. Moreover, the bipolar lithium ion secondary battery 30 has such a structure that a positive electrode tab 38 and a negative electrode tab 39 are connected respectively to the positive electrode side outermost collector 31a (uppermost) and the negative electrode side outermost collector 31b (lowermost), when necessary, via a positive electrode terminal lead 40 and a negative electrode terminal lead 41 respectively. Otherwise, extension of the positive electrode side outermost collector 31a may serve as the positive electrode tab 38 to be lead out of the cell outer package 42 which is a laminate sheet, likewise, extension of the negative electrode side outermost collector 31b may serve as the negative electrode tab 39 to be lead out of the cell outer package 42 which is a laminate sheet.

Moreover, for preventing an external shock or an environmental deterioration during usage, the bipolar lithium ion secondary battery 30 may have such a structure that the generating element (cell element; stack structure) 37 is enclosed in the cell outer package 42 (outer package) in a depressurized manner and the positive electrode tab 38 and the negative electrode tab 39 are taken out of the cell outer package 42. The basic structure of the bipolar lithium ion secondary battery 30 has a plurality of stacked unit cell layers 36 (cell units or unit cells) connected in series.

As set forth above, structural elements and production methods of each of the non-bipolar lithium ion secondary battery 10 and the bipolar lithium ion secondary battery 30 are substantially the same, except that the electric connection (electrode structure) in the lithium ion secondary batteries 10, 30 are different from each other, i.e., "connected in parallel" for the former while "connected in series" for the latter. Moreover, the non-bipolar lithium ion secondary battery 10 and bipolar lithium ion secondary battery 30 of the present invention can be used for pack batteries and vehicles.

[External Structure of Lithium Ion Secondary Battery]

<Section III>

Figure 5:
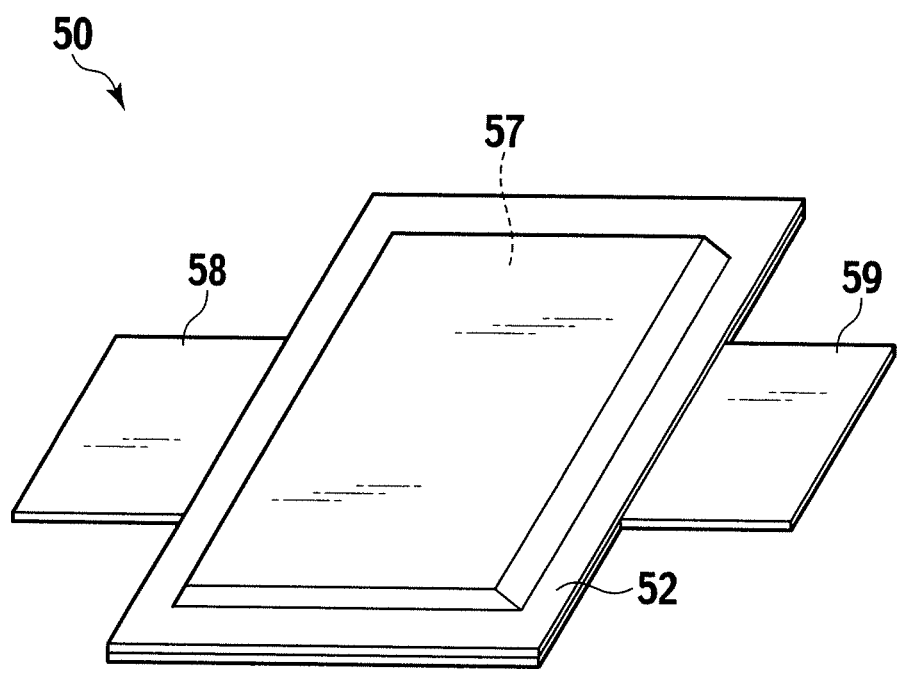
FIG. 5 shows a typical lithium ion secondary battery, that is, a perspective view of a flat stack non-bipolar or bipolar lithium ion secondary battery, according to a section III of the second embodiment of the present invention.

FIG. 5 shows a typical lithium ion secondary battery, that is, a perspective view of a flat stack non-bipolar or bipolar lithium ion secondary battery, according to a section III of the second embodiment of the present invention.

As shown in FIG. 5, a flat stack lithium ion secondary battery 50 is flat and rectangular, with first and second sides thereof formed respectively with a positive electrode tab 58 and a negative electrode tab 59 for taking out electric power. A generating element (cell element) 57 is packed with a cell outer package 52 of the lithium ion secondary battery 50 and has a periphery which is heat sealed. The generating element 57 is sealed in such a state the positive electrode tab 58 and the negative electrode tab 59 are pulled out. Herein, the generating element (cell element) 57 is a counterpart of each of the generating element (cell element) 17 of the non-bipolar lithium ion secondary battery 10 in FIG. 2 and the generating element (cell element) 37 of the bipolar lithium ion secondary battery 30 in FIG. 4. Moreover, the generating element (cell element) 57 is a stack of the unit cell layers 16, 36 including the positive electrodes (positive electrode active material layers) 12, 32, separator layers 13, 35 and negative electrodes (negative electrode active material layers) 15, 33.

In addition, configuration of the lithium ion secondary battery of the present invention is not specifically limited to being stacked and flat as shown in FIG. 3 and FIG. 4, other examples thereof including rolled lithium ion secondary battery which is cylindrical. Otherwise, the above cylinder may be modified into a rectangular flat configuration. The above cylindrical lithium ion secondary battery may have an outer package using a laminate film or a conventional cylindrical can (metal can).

Moreover, the sides for taking out the positive and negative electrode tabs 58, 59 are not specifically limited to those shown in FIG. 5. The positive and negative electrode tabs 58, 59 may be taken out from the same side. Otherwise, a plurality of positive electrode tabs 58 and a plurality of negative electrode tabs 59 may be taken out from first and second sides respectively. Moreover, in the case of the rolled lithium ion secondary battery, for serving as a terminal, the cylindrical can (or metal can) can replace the positive and negative electrode tabs 58, 59.

As a high capacity power source for an electric car, a hybrid electric car, a fuel cell car, and a hybrid fuel cell car and the like, the lithium ion secondary battery of the present invention can be preferably used for a vehicle driving power source or an auxiliary power source for causing demanded high volume energy density and high volume output density.

Hereinafter set forth are structural members of the lithium ion secondary batteries 10, 30, 50 of the second embodiment. However, the components of the electrode are as set forth above, therefore explanation thereof is to be omitted. Moreover, the technical scope of the present invention is not limited to the following description and therefore those conventionally known may be likewise adopted.

[Electrolyte Layer]

Liquid electrolyte or polymer electrolyte may be used for the electrolyte layers 13, 35. Especially, the polymer electrolyte can bring about the effect of the electrode of the present invention.

The liquid electrolyte has such a structure that a lithia water (lithium salt) as a supporting electrolyte is dissolved in an organic solvent as a plasticizer. Examples of the organic solvent as the plasticizer include carbonates such as ethylene carbonate (EC), propylene carbonate (PC) and the like. Examples of the supporting electrolyte (lithia water or lithium salt) include compounds such as LiBETI which compounds can be added to the active material layer.

Meanwhile, the polymer electrolyte is categorized into a gel electrolyte including electrolytic solution and a solid polymer free from electrolytic solution.

The gel electrolyte has such a structure that the above liquid electrolyte is injected in matrix polymer made of ion conductive polymer. Examples of the ion conductive polymer used as the matrix polymer include: polyethylene oxide (PEO), polypropylene oxide (PPO), polyethylene glycol (PEG), polyacrylonitrile (PAN), polyvinylidene fluoride-hexafluoropropylene (PVdF-HEP), polymethyl methacrylate (PMMA), and a copolymer thereof. The above polyalkylene oxide polymers can dissolve electrolytic salt such as lithium salt (lithia water).

Examples of the ion conductive polymer include polyalkylene oxide polymers such as polyethylene oxide (PEO), polypropylene oxide (PPO), and a copolymer thereof.

Examples of the polymers having low lithium ion conductivity include polypropylene oxide (PPO).

Moreover, in the case of the electrolyte layers 13, 35 including the liquid electrolyte or gel electrolyte, a separator may be used for the electrolyte layers 13, 35.

Specific examples of configuration of the separator include fine porous film made of polyolefin such as polyethylene, polypropylene and the like.

The solid polymer electrolyte has such a structure that the supporting electrolyte (lithium salt=lithia water) is dissolved in the above matrix polymer and an organic solvent as a plasticizer is not included. Therefore, in the case of the electrolyte layers 13, 35 including the solid polymer electrolyte, there is no fear of liquid leak from the battery, thus improving reliability of the battery. Especially, preparing the battery using polymer electrolyte such as polyethylene oxide (PEO) can effectively improve cell output and cell capacity.

Forming a cross-linking structure, the matrix polymer of the gel electrolyte and the matrix polymer of the solid electrolyte can bring about an excellent mechanical strength. For forming the cross-linking structure, the following operations are taken: a polymer (i.e., PEO or PPO) for forming a high molecular electrolyte is subjected to polymerizing operations such as thermal polymerization, ultraviolet polymerization, radiating polymerization, electron beam polymerization and the like by using a proper polymerizing imitator.

[Insulating Layer]

As long as having insulating property, sealability (for preventing fall-off of solid electrolyte), sealability (against external moisture's transmission and dampness) and heat resistance under a cell operation temperature and the like, the seal portion (insulation layer) 43 is not specifically limited, examples thereof including urethane resin, epoxy resin, polyethylene resin, polypropylene rein, polyimide resin, rubber and the like. Among the above, the urethane resin and epoxy resin are preferable in view of corrosion resistance, chemical resistance, formability (film-forming property) and economy.

[Tab]

Materials for the tabs (positive electrode tabs 18, 38 and negative electrode tabs 19, 39) are not specifically limited, and therefore those conventionally used for tabs for bipolar batteries may be used, examples thereof including aluminum, copper, titanium, nickel, stainless steel (SUS) and an alloy thereof. Herein, the same material(s) or different materials may be used among the positive electrode tabs 18, 38 and the negative electrode tabs 19, 39. In addition, extension of the outermost collectors 31a, 31b like those according to the second section II of the second embodiment may serve as tabs 18, 38, 19, 39, or otherwise prepared tabs may be connected to the outermost collectors.

(Third Embodiment)

According to a third embodiment, the above batteries 10, 30, 40 of the respective Sections I, II, III of the second embodiment are used for forming a battery module.

A battery module of the present invention has such a structure that a plurality of lithium ion secondary batteries of the present invention are connected together, more in detail, two or more of the lithium ion secondary batteries are connected in series, parallel or both. Connecting the lithium ion secondary batteries in series or parallel can arbitrarily adjust capacity and voltage of the batteries. Otherwise, the battery module of the present invention may have such a structure that the non-bipolar lithium ion secondary battery (or batteries) and bipolar lithium ion secondary battery (or batteries) of the present invention are connected in series, parallel or both.

Figure 6C:
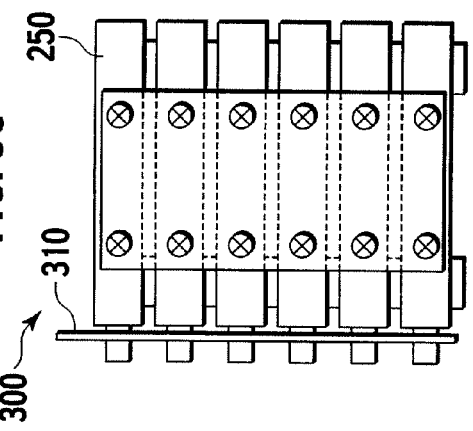
FIG. 6A, FIG. 6B and FIG. 6C show a typical battery module, according to a third embodiment of the present invention, where
Figure 6A:
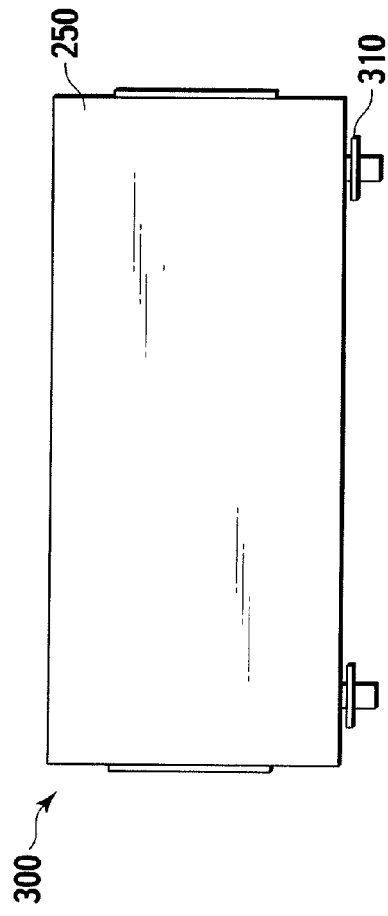
Figure 6B:
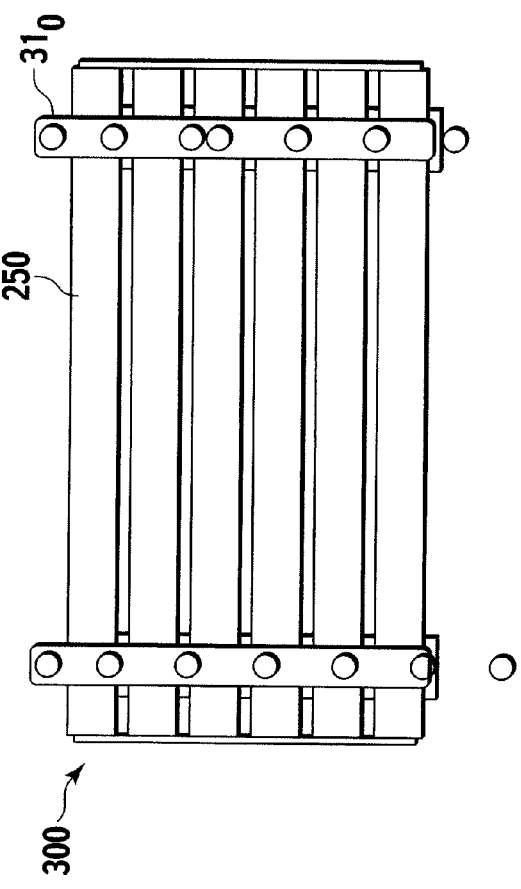

FIG. 6A, FIG. 6B and FIG. 6C show a typical battery module, according to the third embodiment of the present invention, where FIG. 6A is a plan view of the battery module, FIG. 6B is a front view of the battery module and FIG. 6C is a side view of the battery module.

As shown in FIG. 6A, FIG. 6B and FIG. 6C, a battery module 300 of the present invention has such a structure that a plurality of lithium ion secondary batteries are connected in series or parallel, thus forming a small battery module 250 which is attachable and detachable. Moreover, a plurality of small pack batteries 250 are connected in series or parallel, to thereby form the high-capacity and high-output battery module 300 which is proper for a vehicle driving power source or an auxiliary power source for causing demanded high volume energy density and high volume output density. With FIG. 6A, FIG. 6B and FIG. 6C respectively showing plan view, front view and side view of the battery module 300, the small pack batteries 250 (attachable-detachable) thus prepared are mutually connected by means of electric connectors such as bus bar and are stacked by means of a connecting jig 310. How many non-bipolar or bipolar lithium ion secondary batteries are connected for preparing the small battery module 250 and how many small pack batteries 250 are stacked for preparing the battery module 300 are determined according to cell capacity or cell output of the vehicle (electric car).

(Fourth Embodiment)

According to a fourth embodiment, the battery 10 of the second embodiment or the battery module 30 of the third embodiment is installed in a vehicle.

A vehicle of the present invention includes the lithium ion secondary battery of the present invention or the battery module which is a combination of a plurality of above lithium ion secondary batteries. Using the high capacity positive electrode of the present invention can make a battery causing a high energy density, thus accomplishing a plug-in hybrid car featuring a long EV (=Electric Vehicle) travel distance and an electric car featuring a long travel distance per charge. In other words, under the present invention, the lithium ion secondary battery or the battery module which is a combination of a plurality of lithium ion secondary batteries can be used for a driving source of the vehicle. Examples of the vehicle having a long life and a high reliability include four wheelers such as hybrid car, fuel cell car and electric car, two wheelers (motor bike); three wheelers and the like, where the four wheelers including passenger car, truck, commercial vehicle such as bus, mini vehicle and the like. The application of the lithium ion secondary battery or battery module of the present invention is not specifically limited to car, other examples including various power sources of mobile bodies such as electric trains, installed power sources such as non-outage power source, and the like.

Figure 7:
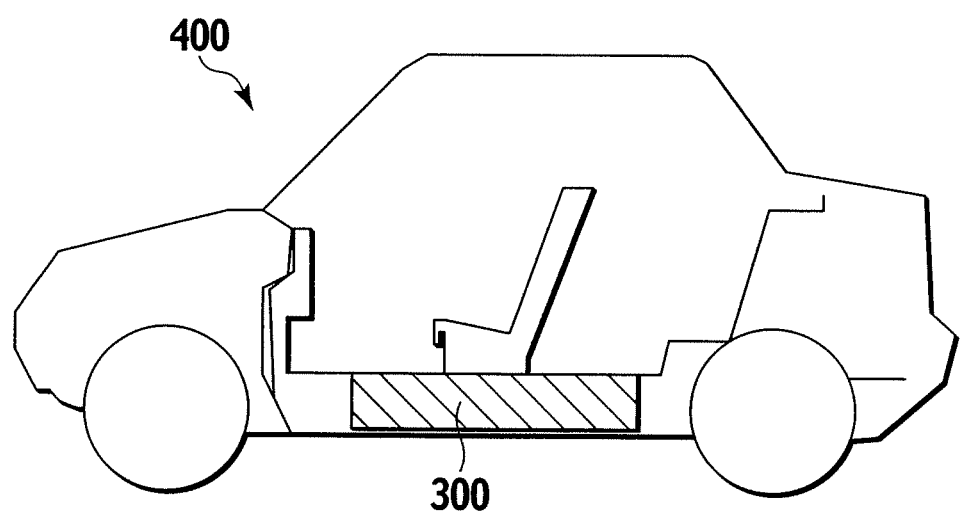
FIG. 7 is a schematic of a car including the battery module, according to a fourth embodiment of the present invention.

FIG. 7 is a schematic of a car including the battery module, according to the fourth embodiment of the present invention.

As shown in FIG. 7, the battery module 300 is installed below a seat of a central part of a body of an electric car 400. Installing below the seat can keep a spacious passenger space and a wide trunk. The position for installing the battery module 300 is, however, not limited to below the seat, other examples thereof including below a rear trunk in a front engine room and the like. The electric car 400 including the above battery module 300 has a high durability and keeps a sufficient output for a long-time operation. In addition, the above battery module 300 works for providing an electric car, a hybrid car and the like which are excellent in fuel economy and traveling performance. The above battery module 300 is also applicable to a hybrid car, a fuel cell car and the like, other than the electric car 400 in FIG. 7.

EXAMPLES

Effects of the present invention will be set forth hereinafter, referring to examples and comparative examples. The present invention is, however, not limited to the examples.

Example 1

<Preparation of Positive Electrode>

A lithium nickel oxide ($LiNiO_2$) (average particle diameter 15 μm) (70 mass %) as a positive electrode active material and a KS6 (average particle diameter 5 μm) (20 mass %) serving as a conductive additive and having a bulk density of 0.07 g/ml, and polyvinylidene fluoride (PVdF) (10 mass %) as a binder were mixed, and then a proper amount of N-methyl-2-pyrrolidone (NMP) as a slurry viscosity preparing solvent was added to the thus mixed, to thereby prepare a first positive electrode active material slurry.

Then, the above $LiNiO_2$ (average particle diameter 15 μm) (70 mass %), an HS100 (average particle diameter 0.05 μm) (20 mass %) serving as a conductive additive and having a bulk density of 0.15 g/ml, and PVDF (10 mass %) as a binder were mixed, and then a proper amount of NMP was added to the thus mixed, to thereby prepare a second positive electrode active material slurry.

Meanwhile, an aluminum foil (thickness: 20 μm) as a positive electrode collector was prepared. On a first surface of the thus prepared collector, the second positive electrode active material slurry prepared above was applied by a weight of 20 $mg/cm^2$ by means of a self-acting coater or a die coater, to thereby form a coated film. Then, the thus coated film was dried.

Then, on the above coated film, the first positive electrode active material slurry was applied by a weight of 20 $mg/cm^2$ by means of a self-acting coater or a die coater, to thereby form a coated film. Then, the thus coated film was dried.

The thus obtained stack structure was pressed by means of a press. The layer of the first positive electrode active material slurry (hereinafter referred to as "first positive electrode active material layer") had a thickness of 87 μm while the layer of the second positive electrode active material slurry (hereinafter referred to as "second positive electrode active material layer") had a thickness of 85 μm.

<Preparation of Negative Electrode>

A hard carbon (average particle diameter 20 μm) (90 mass part) as a negative electrode active material and a polyvinylidene fluoride (PVDF) (10 mass part) as a binder were mixed, and then the mixture was dispersed in an N-methyl-2-pyrrolidone (NMP) as a slurry viscosity preparing solvent, to thereby prepare a negative electrode active material slurry.

Meanwhile, a copper foil (thickness: 10 μm) as a negative electrode collector was prepared. On a first surface of the thus prepared collector, the negative electrode active material slurry prepared above was applied, followed by drying, to thereby obtain a coated film. Then, the thus coated film was pressed, to thereby form a negative electrode having a negative electrode active material layer.

Comparative Example 1

The method like that according to the example 1 was repeated except that an HS100 (average particle diameter 0.05 μm) having a bulk density of 0.15 g/ml was used as a conductive additive in the first positive electrode active material slurry, to thereby prepare each of the positive electrode and the negative electrode. The first positive electrode active material layer had a thickness of 86 μm while the second positive electrode active material layer had a thickness of 85 μM.

Example 2-1

The method like that according to the example 1 was repeated except that a vapor grown carbon fiber VGCF (average particle diameter 15 μm) having a bulk density of 0.04 g/ml was used as a conductive additive in the first positive electrode active material slurry, to thereby prepare each of the positive electrode and the negative electrode. The first positive electrode active material layer had a thickness of 86 μm while the second positive electrode active material layer had a thickness of 86 μm.

Example 2-2

The method like that according to the example 1 was repeated except that a vapor grown carbon fiber VGCF (average particle diameter 15 μm) having a bulk density of 0.04 g/ml was used as a conductive additive in the first positive electrode active material slurry and that a Super-P (average particle diameter 40 nm) having a bulk density of 0.16 g/ml was used as a conductive additive in the second positive electrode active material slurry, to thereby prepare each of the positive electrode and the negative electrode. The first positive electrode active material layer had a thickness of 86 μm while the second positive electrode active material layer had a thickness of 86 μm.

Example 2-3

The method like that according to the example 1 was repeated except that a VGCF (average particle diameter 15 μm) having a bulk density of 0.04 g/ml was used as a conductive additive in the first positive electrode active material slurry and that an SP450 (average particle diameter less than or equal to 1 μm) having a bulk density of 0.10 g/ml was used as a conductive additive in the second positive electrode active material slurry, to thereby prepare each of the positive electrode and the negative electrode. The first positive electrode active material layer had a thickness of 86 μm while the second positive electrode active material layer had a thickness of 86 μm.

Comparative Example 2

The method like that according to the example 1 was repeated except that an HS100 (average particle diameter 0.05 μm) having a bulk density of 0.15 g/ml was used as a conductive additive in the first positive electrode active material slurry, to thereby prepare each of the positive electrode and the negative electrode. The first positive electrode active material layer had a thickness of 86 μm while the second positive electrode active material layer had a thickness of 87 μm.

Example 3

A lithium nickel oxide (LiNiO$_2$) (average particle diameter 15 μm) (75 mass %) as a positive electrode active material and a vapor grown carbon fiber VGCF (average particle diameter 15 μm) (15 mass %) serving as a conductive additive and having a bulk density of 0.04 g/ml, and polyvinylidene fluoride (PVDF) (10 mass %) as a binder were mixed, and then a proper amount of N-methyl-2-pyrrolidone (NMP) as a slurry viscosity preparing solvent was added to the thus mixed, to thereby prepare a first positive electrode active material slurry.

Then, the above LiNiO$_2$ (average particle diameter 15 μm) (85 mass %), a VGCF (average particle diameter 15 μm) (5 mass %) serving as a conductive additive and having a bulk density of 0.04 g/ml, and PVDF (10 mass %) as a binder were mixed, and then a proper amount of NMP was added to the thus mixed, to thereby prepare a second positive electrode active material slurry.

Meanwhile, an aluminum foil (thickness: 20 μm) as a positive electrode collector was prepared. On a first surface of the thus prepared collector, the second positive electrode active material slurry prepared above was applied by a weight of 20 mg/cm$^2$ by means of a self-acting coater or a die coater, to thereby form a coated film. Then, the thus coated film was dried.

Then, on the above coated film, the first positive electrode active material slurry was applied by a weight of 20 mg/cm$^2$ by means of a self-acting coater or a die coater, to thereby form a coated film. Then, the thus coated film was dried.

The thus obtained stack structure was pressed by means of a press. The first positive electrode active material layer had a thickness of 86 μm while the second positive electrode active material layer had a thickness of 87 μm.

The negative electrode was prepared by the method like that according to the example 1.

Comparative Example 3

The method like that according to the example 3 was repeated except that the lithium nickel oxide, VGCF and PVDF in each of the first and second positive electrode active martial slurries had mass ratio of 80:10:10, to thereby prepare each of the positive electrode and the negative electrode. The first positive electrode active material layer had a thickness of 86 μm while the second positive electrode active material layer had a thickness of 87 μm.

Example 4-1

A lithium nickel oxide (LiNiO$_2$) (average particle diameter 15 μm) (85 mass %) as a positive electrode active material and a VGCF (average particle diameter 15 μm) (10 mass %) serving as a conductive additive and having a bulk density of 0.04 g/ml, and polyvinylidene fluoride (PVdF) (5 mass %) as a binder were mixed, and then a proper amount of N-methyl-2-pyrrolidone (NMP) as a slurry viscosity preparing solvent was added to the thus mixed, to thereby prepare a first positive electrode active material slurry.

Then, the above LiNiO$_2$ (85 mass %), a Super-P (average particle diameter 40 nm) (10 mass %) serving as a conductive additive and having a bulk density of 0.16 g/ml, and a PVdF (5 mass %) were mixed, and then a proper amount of N-methyl-2-pyrrolidone (NMP) was added to the thus mixed, to thereby prepare a second positive electrode active material slurry.

Meanwhile, an aluminum foil (thickness: 20 μm) as a positive electrode collector was prepared. On a first surface of the thus prepared collector, the second positive electrode active material slurry prepared above was applied by a weight of 20 mg/cm$^2$ by means of a self-acting coater or a die coater, to thereby form a coated film. Then, the thus coated film was dried. On the thus coated film, the above second positive electrode active material slurry was likewise applied twice, followed by drying. Then, the first positive electrode active material slurry was likewise applied three times, to thereby form a stack of three coated layers.

The thus obtained stack structure was pressed by means of a press, to thereby form first (outermost or facial-most) to sixth positive electrode active material layers, with respective film thicknesses of 48 μm, 48 μm, 50 μm, 50 μm, 51 μm and 51 μm.

The negative electrode was prepared in the method like that according to the example 1.

Example 4-2

A lithium nickel oxide (LiNiO$_2$) (average particle diameter 15 μm) (85 mass %), a KS6 (average particle diameter 5 μm) (10 mass %) serving as a conductive additive and having a bulk density of 0.07 g/ml, and polyvinylidene fluoride (PVdF) (5 mass %) as a binder were mixed, and then a proper amount of N-methyl-2-pyrrolidone (NMP) as a slurry viscosity preparing solvent was added to the thus mixed, to thereby prepare a positive electrode active material slurry of an intermediate sublayer.

To the collector, each of 1) the second positive electrode active material slurry like that in the example 4-1, 2) the above positive electrode active material slurry of the intermediate sublayer, and 3) the first positive electrode active material slurry of the example 4-1 was applied twice in this order, followed by drying, to thereby form a stack structure. The thus obtained stack structure was pressed, to thereby form first (outermost or facial-most) to sixth positive electrode active material layers, with respective film thicknesses of 48 μm, 50 μm, 50 μm, 51 μm, 51 μm and 51 μm.

The negative electrode was prepared in the method like that according to the example 1.

Comparative Example 4

A lithium nickel oxide ($LiNiO_2$) (average particle diameter 15 μm) (85 mass %), a Super-P (average particle diameter 40 nm) (10 mass %) serving as a conductive additive and having a bulk density of 0.16 μl, and polyvinylidene fluoride (PVDF) (5 mass %) as a binder were mixed, and then a proper amount of N-methyl-2-pyrrolidone (NMP) as a slurry viscosity preparing solvent was added to the thus mixed, to thereby prepare a first positive electrode active material slurry.

Likewise, mass ratio of lithium nickel oxide, Super-P and PVDF was set to 72:10:18, to thereby prepare a positive electrode active material slurry of an intermediate sublayer.

Likewise, mass ratio of lithium nickel oxide, Super-P and PVdF was set to 60:10:30, to thereby prepare a second positive electrode active material slurry.

To the collector, each of 1) the above second positive electrode active material slurry, 2) the above positive electrode active material slurry of the intermediate sublayer, and 3) the above first positive electrode active material slurry was applied twice in this order, followed by drying, to thereby form a stack structure. The thus obtained stack structure was pressed, to thereby form first (outermost or facial-most) to sixth positive electrode active material layers, with respective film thicknesses of 48 μm, 49 μm, 50 μm, 50 μm, 50 μm and 51 μm.

The negative electrode was prepared in the method like that according to the example 1.

<Preparation of Test Cell>

The positive electrode and negative electrode prepared in each of the examples and comparative examples were punched by means of a punch, so as to be used for test cells.

Then, a polypropylene porous film (thickness: 20 μm) was prepared as a separator. Moreover, LiBETI as lithia water (lithium salt) was dissolved, at a concentration of 1.0 M, in polyethylene oxide (PEO) polymer (molecular weight about 8500, viscosity 4000 Pa·s), to thereby prepare an electrolyte.

The negative electrode, separator and positive electrode which are obtained above were stacked in this order, and the polymer electrolyte was implanted in the separator. Then, current takeout thermals (i.e., electrode tabs) were connected to the positive electrode and the negative electrode respectively (aluminum terminal to the positive electrode while nickel terminal to the negative electrode). Then, cell elements were put in an aluminum laminate film such that the current takeout terminals were exposed outward. Then, an open part of the laminate film was sealed under a depressurized state, to thereby prepare a test cell.

<Evaluation of Characteristics of Test Cell>

Test cells were prepared for each of the examples and the comparative examples, to thereby implement the initial charging test and the vent test. Specifically, each of the test cells was subjected to a constant current (CC) charging, and then subjected to a constant voltage (CV) charging up to 4.2 V, totaling 15 hr. charging period. Then, the laminate was opened, followed by a vent test at room temperature. The vent test was implemented in such a manner that the cell was put on a flat plate in a vessel, with a weight put on an upper face of the vessel for depressurizing inside of the vessel.

Then, currents 1C, 2C and 5C each calculated from an active material theoretical capacity were used for discharging of the thus prepared test cells for 10 sec from a full-charging state. A resistance as an output index was calculated from a potential and a current which were obtained after 10 sec. A cell capacity (Ah) was multiplied by an average voltage (V) and then the thus obtained product was divided by weight (kg) of the test cell, to thereby calculate an energy density (Wh/kg). Meanwhile, a current (A) was multiplied by an average voltage (V) and then the thus obtained product was divided by weight (kg) of the test cell, to thereby calculate an output density (W/kg).

In the following table 1, a specific power (specific output) of the test cell output was determined in the following manner:

Example 1: based on test cell output 1 of the comparative example 1

Examples 2-1 to 2-3: based on test cell output 1 of the comparative example 2

Example 3: based on test cell output 1 of the comparative example 3

Examples 4-1 and 4-2: based on test cell output 1 of the comparative example 4

TABLE 1-1

| | | Active material | Weight mg·cm$^{-2}$ | Film thickness μm | Active material content % | Conductive additive content % | Binder content % | Type of conductive additive | Conductive additive bulk density g·ml$^{-1}$ | Electrolyte | Energy density | Output density |
|---|---|---|---|---|---|---|---|---|---|---|---|---|
| Example 1 | Facial-most sublayer | $LiNiO_2$ | 20 | 87 | 70 | 20 | 10 | KS6 | 0.07 | Polymer (PEO) | 1 | 1.1 |
| | Collector foil side sublayer | $LiNiO_2$ | 20 | 85 | 70 | 20 | 10 | HS100 | 0.15 | | | |
| Comparative example 1 | Facial-most sublayer | $LiNiO_2$ | 20 | 86 | 70 | 20 | 10 | HS100 | 0.15 | Polymer (PEO) | 1 | 1 |
| | Collector foil side sublayer | $LiNiO_2$ | 20 | 85 | 70 | 20 | 10 | HS100 | 0.15 | | | |
| Example 2-1 | Facial-most sublayer | $LiNiO_2$ | 20 | 86 | 70 | 20 | 10 | VGCF | 0.04 | Polymer (PEO) | 1 | 1.2 |
| | Collector foil side sublayer | $LiNiO_2$ | 20 | 86 | 70 | 20 | 10 | HS100 | 0.15 | | | |

TABLE 1-1-continued

|  |  | Active material | Weight mg·cm$^{-2}$ | Film thickness μm | Active material content % | Conductive additive content % | Binder content % | Type of conductive additive | Conductive additive bulk density g·ml$^{-1}$ | Electrolyte | Energy density | Output density |
|---|---|---|---|---|---|---|---|---|---|---|---|---|
| Example 2-2 | Facial-most sublayer | LiNiO$_2$ | 20 | 86 | 70 | 20 | 10 | VGCF | 0.04 | Polymer (PEO) | 1 | 1.2 |
|  | Collector foil side sublayer | LiNiO$_2$ | 20 | 86 | 70 | 20 | 10 | Super-P | 0.16 |  |  |  |
| Example 2-3 | Facial-most sublayer | LiNiO$_2$ | 20 | 86 | 70 | 20 | 10 | VGCF | 0.04 | Polymer (PEO) | 1 | 1.1 |
|  | Collector foil side sublayer | LiNiO$_2$ | 20 | 86 | 70 | 20 | 10 | SP450 | 0.1 |  |  |  |
| Comparative example 2 | Facial-most sublayer | LiNiO$_2$ | 20 | 86 | 70 | 20 | 10 | HS100 | 0.15 | Polymer (PEO) | 1 | 1 |
|  | Collector foil side sublayer | LiNiO$_2$ | 20 | 87 | 70 | 20 | 10 | HS100 | 0.15 |  |  |  |
| Example 3 | Facial-most sublayer | LiNiO$_2$ | 20 | 86 | 75 | 15 | 10 | VGCF | 0.04 | Polymer (PEO) | 1 | 1.2 |
|  | Collector foil side sublayer | LiNiO$_2$ | 20 | 87 | 85 | 5 | 10 | VGCF | 0.04 |  |  |  |
| Comparative example 3 | Facial-most sublayer | LiNiO$_2$ | 20 | 86 | 80 | 10 | 10 | VGCF | 0.04 | Polymer (PEO) | 1 | 1 |
|  | Collector foil side sublayer | LiNiO$_2$ | 20 | 87 | 80 | 10 | 10 | VGCF | 0.04 |  |  |  |

TABLE 1-2

|  |  | Active material | Weight mg·cm$^{-2}$ | Film thickness μm | Active material content % | Conductive additive content % | Binder content % | Type of conductive additive | Conductive additive bulk density g·ml$^{-1}$ | Electrolyte | Energy density | Output density |
|---|---|---|---|---|---|---|---|---|---|---|---|---|
| Example 4-1 | 1 (Facial-most sublayer) | LiNiO$_2$ | 10 | 48 | 85 | 10 | 5 | VGCF | 0.04 | Polymer (PEO) | 1.2 | 1.2 |
|  | 2 | LiNiO$_2$ | 10 | 48 | 85 | 10 | 5 | VGCF | 0.04 |  |  |  |
|  | 3 | LiNiO$_2$ | 10 | 50 | 85 | 10 | 5 | VGCF | 0.04 |  |  |  |
|  | 4 | LiNiO$_2$ | 10 | 50 | 85 | 10 | 5 | Super-P | 0.16 |  |  |  |
|  | 5 | LiNiO$_2$ | 10 | 51 | 85 | 10 | 5 | Super-P | 0.16 |  |  |  |
|  | 6 (Collector foil side sublayer) | LiNiO$_2$ | 10 | 51 | 85 | 10 | 5 | Super-P | 0.16 |  |  |  |
| Example 4-2 | 1 (Facial-most sublayer) | LiNiO$_2$ | 10 | 48 | 85 | 10 | 5 | VGCF | 0.04 | Polymer (PEO) | 1.2 | 1.3 |
|  | 2 | LiNiO$_2$ | 10 | 50 | 85 | 10 | 5 | VGCF | 0.04 |  |  |  |
|  | 3 | LiNiO$_2$ | 10 | 50 | 85 | 10 | 5 | KS6 | 0.07 |  |  |  |
|  | 4 | LiNiO$_2$ | 10 | 51 | 85 | 10 | 5 | KS6 | 0.07 |  |  |  |
|  | 5 | LiNiO$_2$ | 10 | 51 | 85 | 10 | 5 | Super-P | 0.16 |  |  |  |
|  | 6 (Collector foil side sublayer) | LiNiO$_2$ | 10 | 51 | 85 | 10 | 5 | Super-P | 0.16 |  |  |  |
| Comparative example 4 | 1 (Facial-most sublayer) | LiNiO$_2$ | 10 | 48 | 85 | 10 | 5 | Super-P | 0.16 | Polymer (PEO) | 1 | 1 |
|  | 2 | LiNiO$_2$ | 10 | 49 | 85 | 10 | 5 | Super-P | 0.16 |  |  |  |
|  | 3 | LiNiO$_2$ | 10 | 50 | 72 | 10 | 18 | Super-P | 0.16 |  |  |  |
|  | 4 | LiNiO$_2$ | 10 | 50 | 72 | 10 | 18 | Super-P | 0.16 |  |  |  |
|  | 5 | LiNiO$_2$ | 10 | 50 | 60 | 10 | 30 | Super-P | 0.16 |  |  |  |
|  | 6 (Collector foil side sublayer) | LiNiO$_2$ | 10 | 51 | 60 | 10 | 30 | Super-P | 0.16 |  |  |  |

Example 1 Compared with Comparative Example 1

Positive electrode active material content in the positive electrode active material layer is substantially the same. Therefore, the energy density of the cell is substantially the same. However, the example 1 has an increased voidage of the first positive electrode active material layer which is the facial-most sublayer, thereby improving impregnating property of the polymer electrolyte. As a result, the example 1 is more improved in output density than the comparative example 1.

Examples 2-1 to 2-3 Compared with Comparative Example 2

Positive electrode active material content in the positive electrode active material layer is substantially the same. Therefore, the energy density of the cell is substantially the same. However, the examples 2-1 to 2-3 each have an increased voidage of the first positive electrode active material layer which is the facial-most sublayer, thereby improving impregnating property of the polymer electrolyte. As a result, the examples 2-1 to 2-3 each are more improved in output density than the comparative example 2. Especially, it is found that using vapor grown carbon fiber VGCF for the conductive additive of the first positive electrode active material layer increases the voidage, thus further improving the output density.

Example 3 Compared with Comparative Example 3

Total active material content of the first and second positive electrode active material layers (=facial-most sublayer+collector foil side sublayer) is substantially the same. Therefore, the energy density of the cell is substantially the same. However, the first positive electrode active material layer (facial-most sublayer) of the example 3 has greater conductive additive content, which increases voidage but secures conductivity, thus increasing output density.

Examples 4-1 and 4-2 Compared with Comparative Example 4

The comparative example 4 has greater binder content than that of each of the examples 4-1 and 4-2, thereby changing the voidage. With this, the comparative example 4 has a relatively small active material content, thus decreasing output density. Meanwhile, the examples 4-1 and 4-2 each have a preferable energy density and a preferable output density.

As set forth above, the electrode of the present invention allows the polymer electrolyte to sufficiently impregnate to such an extent as to reach the active material layer's part in the vicinity of the collector (which was conventionally difficult to accomplish in the case of a thickened active material layer), resulting in an effective contribution to improvement of the output characteristic of the cell.

Moreover, the electrode of the present invention controls voidage of the active material layer in a state that the active material content in the active material layer is kept high, to thereby prepare a high-energy density cell.

Although the present invention has been described above by reference to certain embodiments and certain examples, the present invention is not limited to the embodiments and examples described above. Modifications and variations of the embodiment(s) and examples described above will occur to those skilled in the art, in light of the above teachings.

This application is based on a prior Japanese Patent Application No. P2007-162916 (filed on Jun. 20, 2007 in Japan). The entire contents of the Japanese Patent Application No. P2007-162916 from which priority is claimed are incorporated herein by reference, in order to take some protection against translation errors or omitted portions.

The scope of the present invention is defined with reference to the following claims.

What is claimed is:

1. A battery electrode, comprising:
   a collector; and
   an active material layer formed on a surface of the collector and including:
   an active material,
   a conductive additive having a bulk density which is gradually decreased in a direction from a collector side of the active material layer to a surface side of the active material layer, and
   a binder,
   wherein the active material layer includes at least:
   a first active material sublayer, and
   a second active material sublayer between the collector and the first active material sublayer,
   wherein the bulk density of the conductive additive of the first active material sublayer is smaller than the bulk density of the conductive additive of the second active material sublayer,
   wherein a bulk density difference between each adjacent sublayer is 0.03 g/ml or more and 0.12 g/ml or less, and
   wherein a ratio of (i) the bulk density of the conductive additive included in a sublayer on the surface side of the active material layer relative to (ii) the bulk density of the conductive additive included in a sublayer on the collector side of the active material layer is in a range of 0.2 to 0.4.

2. The battery electrode according to claim 1, wherein the bulk density of the conductive additive of the first active material sublayer is in a range of 0.01 g/ml to 0.05 g/ml.

3. The battery electrode according to claim 1, wherein the active material layer has a thickness in a range of 20 μm to 500 μm.

4. The battery electrode according to claim 1, wherein the active material layer includes two or more active material sublayers, and
each of the active material sublayers has a thickness in a range of 10 μm to 100 μm.

5. The battery electrode according to claim 1, wherein the conductive additive includes a carbon material.

6. A lithium ion secondary battery, comprising:
at least one unit cell layer including:
   a positive electrode, an electrolyte layer and a negative electrode which are stacked in this order,
wherein at least one of the positive electrode and the negative electrode is the battery electrode according to claim 1.

7. The lithium ion secondary battery according to claim 6, wherein
the electrolyte layer includes at least one of:
   a liquid electrolyte, and
   a polymer electrolyte including at least one of:
      a gel electrolyte including an electrolytic solution, and
      a solid polymer electrolyte free from an electrolytic solution.

8. The lithium ion secondary battery according to claim 7, wherein
the electrolyte layer includes the solid polymer electrolyte.

9. A battery module, comprising:
the lithium ion secondary battery according to claim 6.

10. A vehicle, comprising:
the lithium ion secondary battery according to claim 6.

11. A vehicle, comprising:
the battery module according to claim 9.

12. The battery electrode according to claim 1, wherein content of the binder in each of the active material sublayers is constant.

13. A battery electrode, comprising:
a collector, and
an active material layer formed on a surface of the collector and including:

an active material,
a conductive additive having a bulk density which is gradually decreased in a direction from a collector side of the active material layer to a surface side of the active material layer, and
a binder,
wherein the active material layer includes at least:
a first active material sublayer, and
a second active material sublayer between the collector and the first active material sublayer,
wherein a content of the active material in each of the active material sublayers is constant,
wherein a bulk density difference between each adjacent sublayer is 0.03 g/ml or more and 0.12 g/ml or less, and
wherein a ratio of (i) the bulk density of the conductive additive included in a sublayer on the surface side of the active material layer relative to (ii) the bulk density of the conductive additive included in a sublayer on the collector side of the active material layer is in a range of 0.2 to 0.4.

14. The battery electrode according to claim 13, wherein a content of the conductive additive in each of the active material sublayers is constant.

15. The battery electrode according to claim 1, wherein a ratio of mass percent of the active material, a mass percent of the conductive additive, and a mass percent of the binder in one sublayer of the active material layer has the same value as a ratio of a mass percent of the active material, a mass percent of the conductive additive and a mass percent of the binder in another sublayer of the active material layer.

* * * * *